J. H. & E. R. ELMER.
Gearing for Churn Powers.

No. 229,391. Patented June 29, 1880.

WITNESSES:
C. Neveux
C. Sedgwick

INVENTOR:
J. H. Elmer
E. R. Elmer
BY Munn & Co
ATTORNEYS.

UNITED STATES PATENT OFFICE.

JOHN H. ELMER, OF ASHFIELD, AND EDWIN R. ELMER, OF BUCKLAND, MASSACHUSETTS.

GEARING FOR CHURN-POWERS.

SPECIFICATION forming part of Letters Patent No. 229,391, dated June 29, 1880.

Application filed April 18, 1879.

*To all whom it may concern:*

Be it known that we, JOHN H. ELMER, of Ashfield, in the county of Franklin and State of Massachusetts, and EDWIN R. ELMER, of Buckland, in the county of Franklin and State of Massachusetts, have invented a new and Improved Gearing for Churn-Powers, of which the following is a specification.

Figure 1:
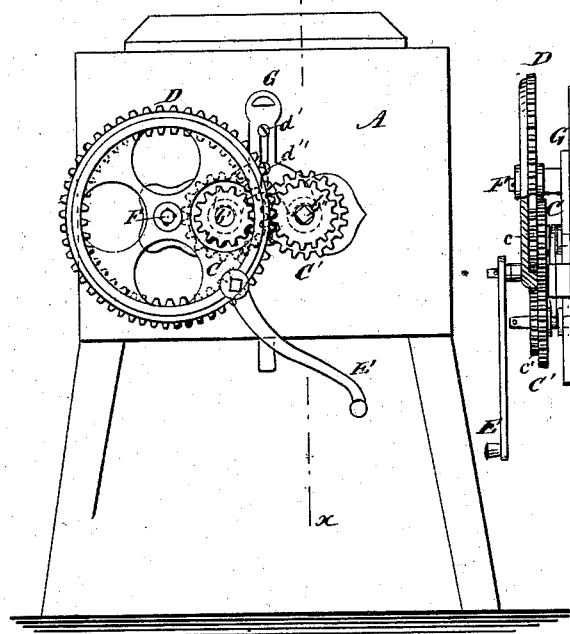
Figure 2:
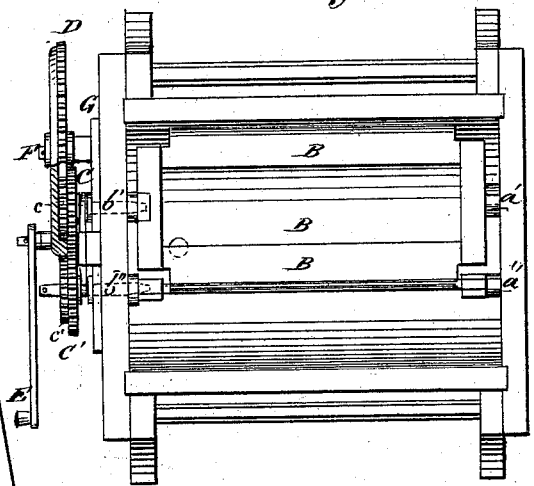
Figure 3:
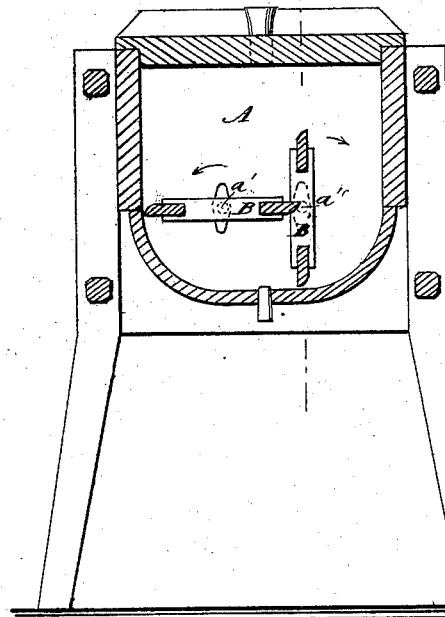
Figure 4:
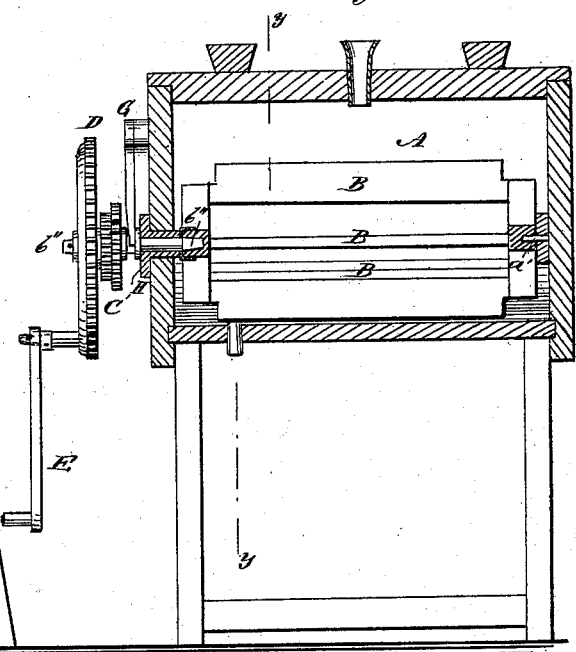
Figure 6:
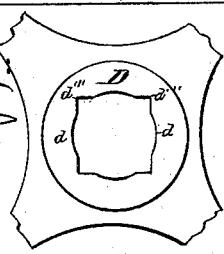
Figure 5:
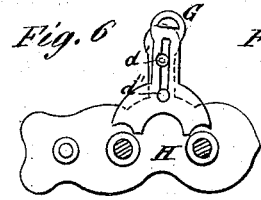

Figure 1 is a side elevation of the churn. Fig. 2 is a plan of the churn, partly in section. Fig. 3 is a vertical section on line $y\ y$, Fig. 4. Fig. 4 is a vertical section on line $x\ x$, Fig. 1. Fig. 5 is a front elevation of the side G and plate H. Fig. 6 shows the bore of the hub of the main cog-wheel.

Similar letters of reference indicate corresponding parts.

The object of the invention is to provide a wheel cogged on both sides of its rim and having a curved central aperture angled in such a way as to adapt it to turn on a round or with a square shaft, as hereinafter described.

$b'\ b''$ represent shafts, which are provided with double cog-wheels C C' on the outside of box. The shaft $b''$ projects with a square shoulder beyond the wheels C' c', to receive the driving cog-wheel D, provided with teeth on the inner and the outer circumference of its rim, and with a crank, E, attached to its face near its periphery.

The two large wheels C C' gear together, while one pinion, C, gears with the teeth on the inside of the rim of wheel D, and the other pinion, C', gears with the teeth on the outside of the rim of said wheel, so that the churn can be run whether the wheel D gears with both of the pinions, as shown in Fig. 1 of the drawings, or with neither, when arranged on the squared end of the shaft $b''$, as shown in Fig. 4 of the drawings.

F is a fixed shaft having a round end, on which the wheel D may turn when it is desired to run with great rapidity; but when a slow motion is required the wheel D is placed on the squared end of shaft $b''$. In order that the wheel D may be adapted to work on either a round or square shaft end it is provided with a curved aperture, $d$, and an angular portion, $d''$.

G is a slotted slide, forked and held to the plate H by pins or screws $d'$, that pass through its slots, and is employed to hold the shafts $b'\ b''$ down in their bearings during the operation.

What we claim as new and of our invention is—

The wheel D, cogged on both sides of its rim, and having a central aperture curved at $d$ and angular at $d'''$, as and for the purpose specified.

JOHN HARLOW ELMER.
EDWIN ROMANZO ELMER.

Witnesses:
H. M. PUFFER,
HIRAM TEMPLE.